Feb. 21, 1967 M. I. GLASS ETAL 3,305,236
GAME WITH MISSILE THROWING DEVICES AND
GAMEBOARD DIVIDING WALL
Filed Feb. 28, 1964 4 Sheets-Sheet 1

Inventors
MARVIN I. GLASS
HENRY STAN
By Anderson, Luedeka, Fitch, Even & Tabin
Atty's Feb. 21, 1967
M. I. GLASS ETAL
3,305,236
GAME WITH MISSILE THROWING DEVICES AND
GAMEBOARD DIVIDING WALL
Filed Feb. 28, 1964
4 Sheets-Sheet 3
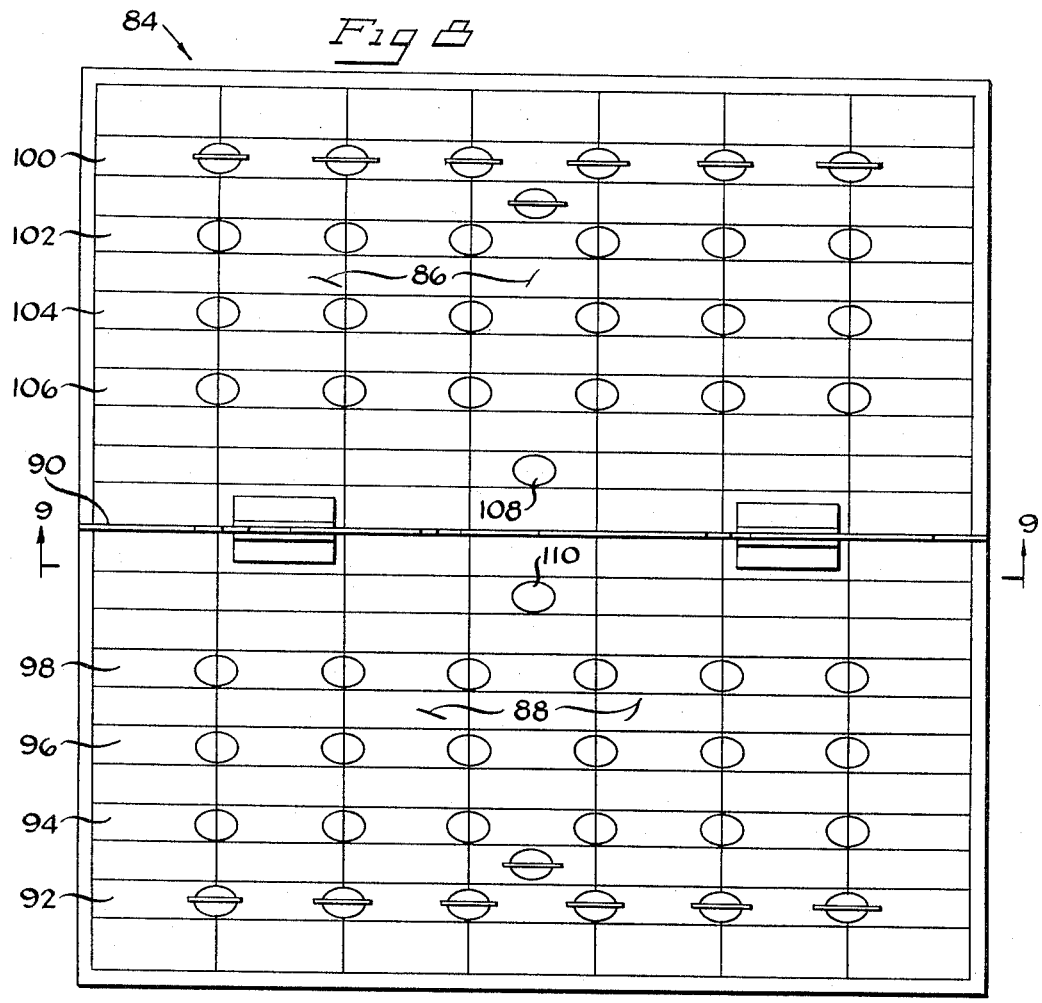
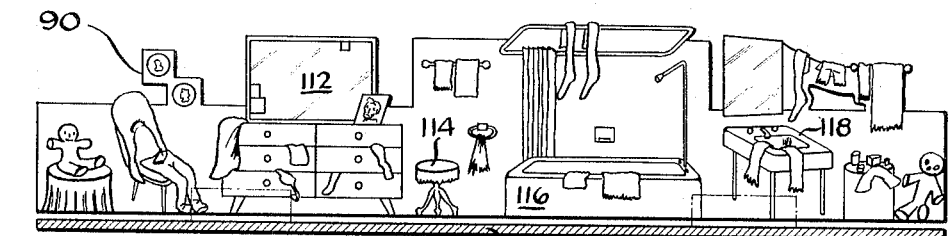
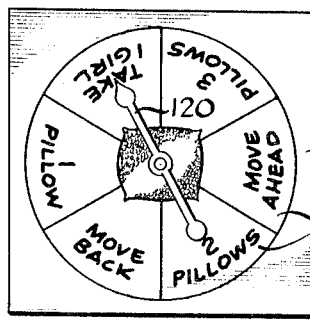
Inventors
MARVIN I. GLASS
HENRY STAN
By Anderson, Luedeka, Fitch, Even & Tabin
Atty's Feb. 21, 1967 M. I. GLASS ETAL 3,305,236
GAME WITH MISSILE THROWING DEVICES AND
GAMEBOARD DIVIDING WALL
Filed Feb. 28, 1964 4 Sheets-Sheet 4
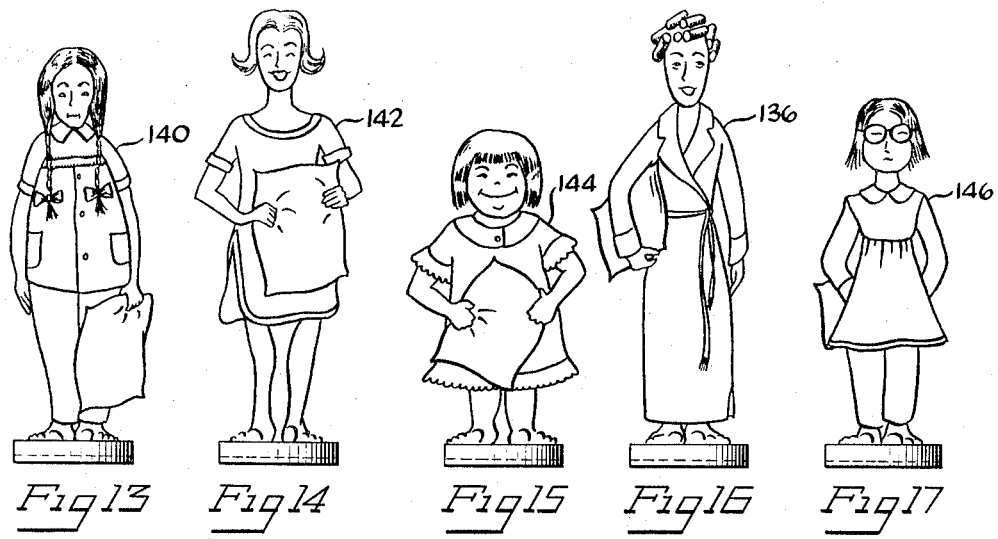
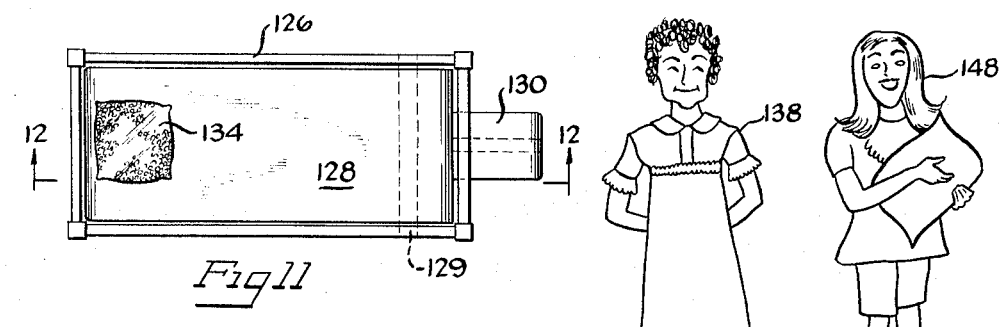
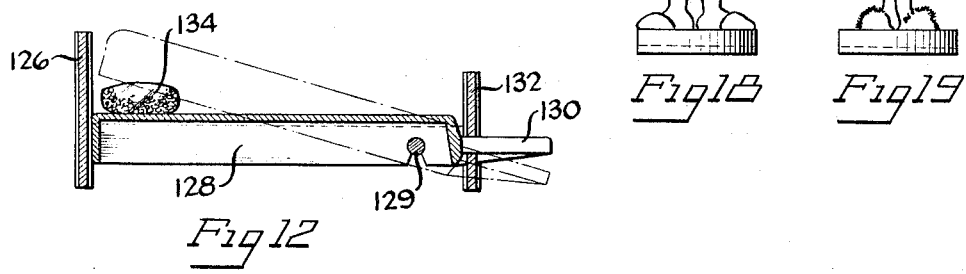
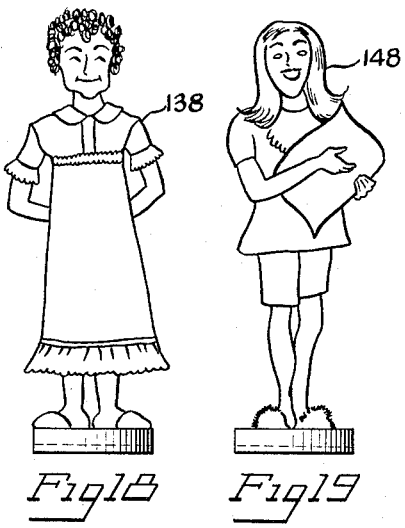
Inventors
MARVIN I. GLASS
HENRY STAN
By Anderson, Luedeka, Fitch, Even & Tabin
Atty's United States Patent Office 3,305,236
Patented Feb. 21, 1967

3,305,236
GAME WITH MISSILE THROWING DEVICES AND
GAMEBOARD DIVIDING WALL
Marvin I. Glass and Henry Stan, Chicago, Ill., assignors to Marvin Glass & Associates, Chicago, Ill., a partnership
Filed Feb. 28, 1964, Ser. No. 348,064
7 Claims. (Cl. 273—95)

The present invention relates to games, and particularly to a game in which the fortunes of the players are determined partly by chance, in which the several operations are of such a nature as to be of interest particularly to younger players, and in which a certain amount of judgment must be exercised along with an appreciable amount of skill, in order to take advantage of the results of the chance mechanism. Thus, in one embodiment of the game a cannon is involved, and the chance mechanism will indicate whether the cannon is to be fired, and if so how many shots are permitted. Skill in aiming and shooting the cannon can, of course, make a significant difference in the results of the turn for the particular player involved.

The game is played on a board which has an obstruction erected across it midway between the opposing players, each player has a set of game pieces in the form of persons, and the object of the game is for one player to shoot down the opponent's people or take them prisoner before the opponent can take or shoot down his. In one embodiment, the persons involved are soldiers, but other types of persons may be simulated, as for example the guests at a slumber party who engage in a pillow fight. The later embodiment might be expected to appeal particularly to girls, while the solder embodiment would normally appeal more to boys.

In playing the boys' game, each player will have a set of soldiers which he lines up on his side of the board facing a fence-like divider simulating a fortress or castle. Behind each line is a toy cannon which shoots light harmless "cannon balls," the whole being conveniently made of plastic or any suitable material. A chance mechanism in the form of a dial with a rotatable arrow or index is provided, and the first player spins the arrow, which, when it comes to rest indicates on the dial whether the player is to "charge," "retreat," take one of the opponent's soldiers "prisoner," or shoot the cannon, and if so how many shots are to be taken. The cannon shots must go over the fortress and knock over some of the opponent's soldiers. The game is won when all of the opponent's soldiers have been slain or taken prisoner.

The principal object of the invention is to provide a game of this nature which will involve both chance and skill, and which will appeal to players of a relatively early age. Other objects and advantages will become apparent from the following description of the selected embodiments of the invention.

In the drawings:

FIGURE 8 is a view similar to FIGURE 1 of a modified game board;

FIGURE 9 is a front elevation of a divider simulating a partition or house wall;

FIGURE 10 is a plan view of a modified chance controlled indicating device;

FIGURE 11 is an enlarged plan view of a toy bed;

FIGURE 12 is a vertical sectional view in a vertical sectional view of the same on the line 12—12 of FIGURE 11; and FIGURES 13 to 19, inclusive, are enlarged front elevations of game pieces simulating guests at a slumber party.

Figure 1:
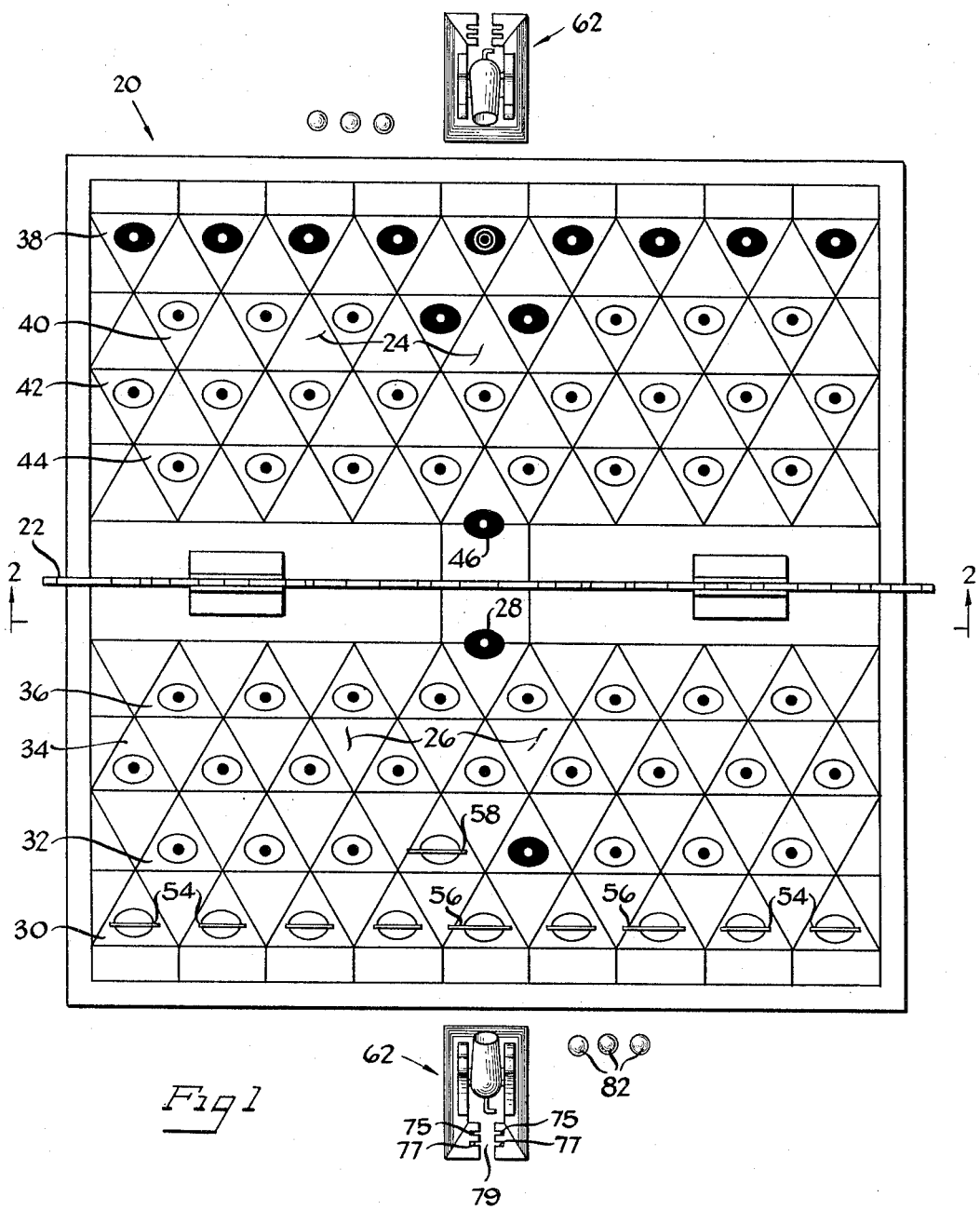
FIGURE 1 is a plan view of a game board forming part of the invention, together with a pair of toy cannons and their ammunition.
Figure 2:
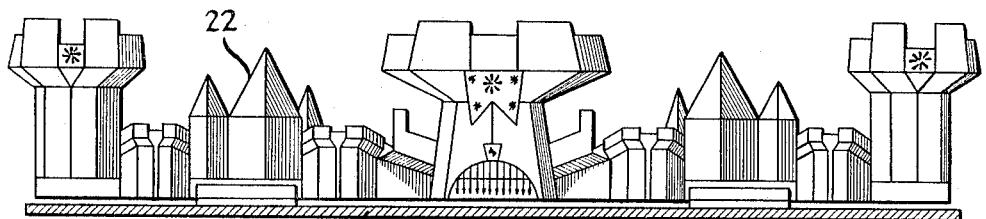
FIGURE 2 is a front elevation of a divider simulating a fortress, indicated in FIGURE 1.

As seen in FIGURE 1, the game as a whole comprises a game board 20, which is divided at its mid-portion by a dividing means 22, which in one embodiment simulates a fortress, best seen in FIGURE 2, and which divides the board into equal playing areas 24 and 26, and each playing area is in turn divided into a large number of stations, in the present instance thirty-five, distributed in rows of eight and nine, with one station 28 advanced in front of the several rows, which are designated as 30, 32, 34 and 36. The game is intended for two players, and each player is in command of one area or battlefield, as 26. Each player also has nine soldiers and a captain, and the player in command of area 26 starts with his soldiers lined up on row 30 with his captain on one of the stations in row 32. The opposing player lines up his soldiers in like manner on row 38 of area 24, using rows 38, 40, 42 and 44, and the captain's station 46, as the game progresses. The game pieces are then arranged like two opposing armies, but separated by the fortress, which offers a certain amount of protection, as will appear.

Figure 3:
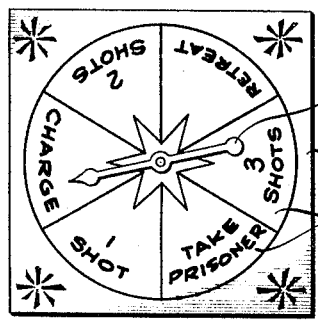
FIGURE 3 is a plan view of a chance controlled indicating device.

While a variety of rules may be formulated for playing games with the apparatus disclosed, it is contemplated that the players will choose by chance in some manner who is to have the first turn, and the winner at this stage has the privilege of spinning an arrow 48 (FIGURE 3), which constitutes a chance controlled indicator working with a set of instructions 50 carried on a dial 52. The player must abide by the instructions to which the arrow points when it has ceased rotating. Thus, if the instructions say "Take Prisoner," the player has the opportunity of taking a soldier of the opposing player, which removes that particular soldier from the field.

If the instructions say, for example, "Three Shots," the player, instead of taking a prisoner, may shoot the cannon 62 and endeavor to knock down as many of his opponent's soldiers as possible with his three shots.

Figure 4:
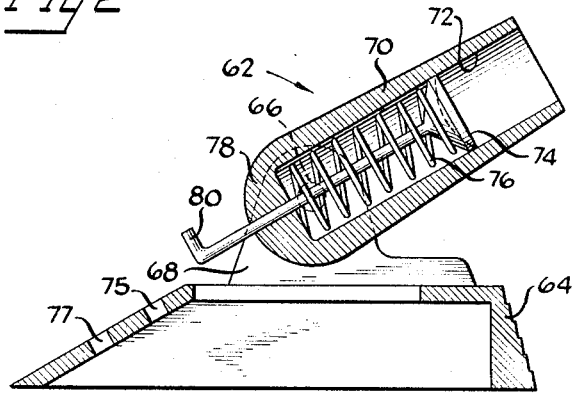
FIGURE 4 is an enlarged, vertical axial sectional view of a cannon indicated in FIGURE 1.
Figure 5:
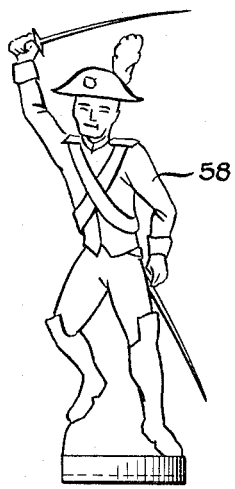
FIGURE 5 is an enlarged front elevation of a game piece representing a captain.
Figure 6:
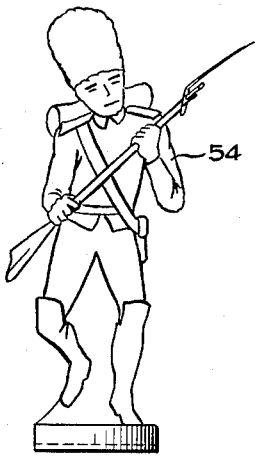
FIGURE 6 is a similar view of a foot soldier with a gun.
Figure 7:
FIGURE 7 is a similar view of a soldier with a flag.

Cannon 62 consists of a base 64, best seen in FIGURE 4, on which is mounted on trunnions 66 engaging upwardly directed supports 68, a barrel portion 70. Barrel 70 has a bore 72 in which is reciprocable a plunger unit 74 which is impelled in one direction by a spring 76 engaged at one end with plunger unit 74, and at the other end with the breach portion 78 of barrel 70. Plunger unit 74 is retracted or "cocked" by a backward pull on a grip 80 which extends backwardly from unit 74 in guided relation through breach portion 78. In operation, a cannon ball 82 (FIGURE 1) is placed in bore 72 and unit 74 is retracted and released, whereupon spring 76 will cause a more or less forceful advance movement of plunger unit 74, and will throw the ball in the direction in which the barrel 70 is aimed.

The force with which the missile will be expelled is dependent upon the amount to which plunger unit 74 is retracted, which, as will be understood, determines the stress in spring 76 immediately prior to its release, and suitable means is provided to definitely predetermine the amount of retraction in order to control the range of the cannon, and also to provide a plurality of such means which will give a plurality of ranges to the cannon, so as to give an opportunity for the exercise of judgment to avoid overshooting the "enemy." In this respect, it will be particularly noted in FIGURES 1 and 4 that the base of the cannon includes along the rearward portion thereof a pair of laterally disposed grooves or slots 75 and 77 which extend to the side of a central opening 79. These slots are positioned to receive the grip or trigger portion 80 of the firing plunger 74 when the plunger is moved rearwardly against the action of spring 76 and trigger 80 is rotated. Consequently, the trigger 80 can be held in any selected one of the grooves 75, 77, so as to "cock" the firing plunger, and the latter can be released as desired by flicking the trigger 80 with a finger.

If the instructions should say "Charge," the player might be privileged to move his entire force one row closer to the fortress, for example. from row 30 to row 32, and thus get the benefit of a certain amount of shelter from the opponent's cannon by reason of his closer proximity to the fortress. Three "Charges" would permit him to take up row 36, where his soldiers would stand a much lesser chance of being hit by missiles from the opponent's cannon.

It will be noted that the captain is normally located in front of the other soldiers, and, therefore, is closer to the fortress than the other men. He is therefore somewhat harder to hit, and if desired, the game could be scored on a point system, and a greater number of points would be earned by hitting a captain 58 than for an ordinary soldier. Also, if desired, a greater number of points could be given for hitting a flagman 56.

If the instructions should say "Retreat," the soldiers could be required to go back one row, which, as will be apparent from the foregoing discussion, would constitute a serious disadvantage, since it is easier to hit a soldier farther from the fortress than it is to hit one near to the same.

The same principle may be applied to a game which will have more appeal to girls. In this embodiment (FIGURES 8–19), a game board 84 which is separated into two areas 86 and 88 by a divider 90, has rows of stations 92, 94, 96 and 98 on area 88, and rows 100, 102, 104 and 106 on area 86. In addition, area 86 has a leader's station 108, while area 88 has a leader's station 110.

Divider 90 in this embodiment simulates a wall of a house with pieces of furniture, for example, a dresser 112, a stool 114, a bath tub 116, a wash bowl 118, and others not necessary to describe in detail, but all encumbered with articles of clothing and more or less in disarray, as might be expected under the circumstances, and which will add to the amusement.

Again the game is intended primarily for two players, each being allotted seven house "guests," one of whom may act as a leader or captain. In this case, the missiles are pillows instead of cannon balls, and the guests are in night clothes.

As in the prior embodiment, the first player may be chosen by lot, and has the privilege of spinning the arrow 120 (FIGURE 10), of a chance controlled indicator having a dial 122 carrying a plurality of legends of instruction 124. The player must abide by the instruction on which the arrow comes to rest, and may throw as many pillows as designated, or may move ahead, or must move back, as directed. As before, moving ahead is an advantage, whereas moving back is a disadvantage.

The device for throwing the pillows comprises a bed frame 126 (FIGURES 11 and 12), in which is mounted a simulated mattress 128, with the entire bed and pillow being preferably of plastic. The mattress 128 is supported near the foot of the bed on a pivotal connection or fulcrum 129 so that the head end of the mattress may be raised to a position wherein the mattress is sharply upwardly tilted. A lever or finger pad 130 is fixedly secured to the mattress at the end nearest to fulcrum 129, and projects through a suitable opening in the foot-board 132 of bed frame 126, so as to be accessible for operation of the apparatus in the manner of a catapult. Mattress 128 is, in reality, a rigid element made of molded plastic or other suitable material, and when a simulated pillow 134 is placed in the usual position at the head end of the mattress, and pad 130 is pressed, mattress 128 will be tilted upwardly in a manner violent enough to cause pillow 134 to be thrown in an upward and forward direction with considerable force. By the utilization of sufficient skill on the part of the player, the pillow may be given a trajectory which will carry it over the divider 90 to knock down one or more of the girls on the other side. The opening in foot-board 132 will limit the movement of finger pad 130 and thereby serve as a means to determine the normal position of mattress 128, and to limit the upward tilting thereof.

The figures in the various views may represent people who would be apt to be present such as chaperones 136 and 138 (FIGURES 16 and 18, respectively), and guests 140, 142, 144, 146 and 148.

As in the case of the soldier embodiment, any game piece knocked over is out of the game, and the object is for a player to knock down or take as many as possible of her opponent's pieces. The game is won by the player who is still in the game when all of her opponent's pieces are knocked down or taken.

Variations in the apparatus used in playing the game will doubtless occur to others skilled in the art, and the invention is not to be taken as limited to the embodiments disclosed, or in fact in any manner except as defined in the claims.

What is claimed is:

1. In a game, a game board having markings thereon defining generally parallel rows of stations for playing pieces, dividing means extending across the mid-portions of the board and projecting upwardly therefrom, a set of game pieces for each player shaped to be set up on said stations on opposite sides of said dividing means, a throwing device for each player, a plurality of missiles shaped to be thrown by said throwing device, a dial containing a plurality of legends of instruction for movement of said pieces and operation of said throwing device, and a chance controlled indicator positioned to point out said instructions on said dial.

2. In a game, a game board having markings thereon defining generally parallel rows of stations for playing pieces, dividing means simulating a fortress extending across the mid-portion of the board and projecting upwardly therefrom, a set of soldiers for each player, said soldiers being shaped to be set up on opposite sides of said fortress, a toy cannon for each player, a plurality of cannon balls shaped to be thrown by the cannon over the fortress to knock down one or more of the opposing soldiers, a dial containing a plurality of legends of instruction for movement of said pieces and operation of said cannon, and a chance controlled indicator positioned to point out said instructions on said dial.

3. In a game, a game board having markings thereon defining generally parallel rows of stations for playing pieces, dividing means simulating a house wall having a plurality of fixtures and pieces of furniture thereon, extending across the mid-portion of the board and projecting upwardly therefrom, a set of game pieces simulating guests at a slumber party, said pieces being shaped to be set up on said stations on opposite sides of said house wall, a bed for each player, a plurality of pillows, said beds each having a movable mattress section arranged to be raised abruptly to throw a pillow placed thereon over said house wall to knock down one or more of the guests of the opposing player, a dial containing a plurality of legends of instruction for movement of said pieces and operation of said beds to throw said pillows, and a chance controlled indicator positioned to point out said instructions on said dial.

4. In a game, a game board, dividing means simulating a fortress extending across the mid-portion of the board and projecting upwardly therefrom, said game board carrying a relatively large number of stations arranged in rows in graduated spaced relation to said fortress, a set of soldiers for each player, each set including a captain, said soldiers being shaped to be set up on the stations on opposite sides of said fortress, a toy cannon for each player, and a plurality of cannon balls shaped to be thrown by the cannon over the fortress to knock down opposing soldiers, a device having a plurality of legends of instruction, including "Charge," and a chance controlled means for indicating to a player one of said legends of instruction, said "Charge" instructions permitting said player to move his soldiers up to stations close to said fortress where they will be shielded from the cannon of the opposing player, by said fortress.

5. In a game, a game board, dividing means simulating a house wall having a plurality of fixtures and pieces of furniture thereon, extending across the mid-portion of the board and projecting upwardly therefrom, said game board carrying a relatively large number of stations arranged in rows in graduated spaced relation to said house wall, a set of game pieces simulating guests at a slumber party, said pieces being shaped to be set up on the stations on opposite sides of said house wall, a toy bed for each player, and a plurality of pillows, said beds each having a movable mattress section arranged to be raised abruptly to throw a pillow placed thereon over said house wall to knock down one or more of the guests of the opposing player, a device having a plurality of legends of instruction including "Move Ahead," and chance controlled means for indicating to a player one of said legends of instruction, and said "Move Ahead" instruction permitting said player to move her guests up to stations closer to said house wall where they will be shielded from the pillows thrown from the bed of the opposing player.

6. In a game, a game board, dividing means extending across the mid-portion of the board, a set of game pieces for each player, said game board carrying a relatively large number of stations arranged in rows in graduated spaced relation to said dividing means, a set of game pieces for each player, said game pieces being shaped to be set up on the stations on opposite sides of said dividing means, a throwing device for each player, a plurality of missiles shaped to be thrown by said throwing device, a device having a plurality of legends of instruction including "One Shot," "Two Shots," "Three Shots," "Retreat," "Take Prisoner," and "Charge," and chance controlled means for indicating to a player one of said legends of instruction.

7. In a game, a game board, dividing means extending across the mid-portion of the board, a set of game pieces for each player, said game board carrying a relatively large number of stations arranged in rows in graduated spaced relation to said dividing means, a set of game pieces for each player, said game pieces being shaped to be set up on the stations on opposite sides of said dividing means, a throwing device for each player, a plurality of missiles shaped to be thrown by said throwing device, a device having a plurality of legends of instruction including "One Pillow," "Two Pillows," "Three Pillows," "Take One Girl," "Move Ahead," and "Move Back," and chance controlled means for indicating to a player one of said legends of instruction.

References Cited by the Examiner

UNITED STATES PATENTS

| | | | |
|---|---|---|---|
| 651,811 | 6/1900 | Sexton | 273—134 |
| 1,129,613 | 2/1915 | Straub. | |
| 1,223,859 | 4/1917 | Doan | 273—101 |
| 1,303,494 | 5/1919 | Nichols | 273—95 |

FOREIGN PATENTS

| | | |
|---|---|---|
| 123,844 | 1901 | Germany. |

RICHARD C. PINKHAM, *Primary Examiner.*

DELBERT B. LOWE, *Examiner.*

M. R. PAGE, *Assistant Examiner.*